Patented June 26, 1945

2,378,898

UNITED STATES PATENT OFFICE 2,378,898

S - SUBSTITUTED MERCAPTOMETHYL ETHERS OF HYDROXYLATED POLYMERS

William James Burke, Marshallton, Del., assignor to E. I. du Pont de Nemours & Company, Wilmington, Del., a corporation of Delaware No Drawing. Application June 20, 1944, Serial No. 541,275

17 Claims. (Cl. 260—213)

This invention relates to new sulfur containing polymers. More particularly it relates to new polymeric thiomethyl ethers and methods for their preparation.

An object of this invention is the preparation of polymeric thiomethyl ethers by a simple process from inexpensive raw materials. A further object is the preparation of new, high molecular weight, linear polymeric thiomethyl ethers suitable for use in the preparation of films, fibers, plastics and coating compositions. Another object is to prepare 2-thiazolinylthiomethylcellulose acetate. Other objects will appear hereinafter.

These objects are accomplished by the following invention wherein linear, high molecular weight, organic solvent-soluble, hydroxyl containing polymers are reacted with formaldehyde and a monomeric organic thiol in solution in an inert liquid organic solvent in the presence of an acidic catalyst. The resulting novel, organic solvent-soluble, polymeric thiomethyl ethers represent an important part of this invention.

This invention is carried out in the preferred manner by reacting in solution an organic solvent-soluble, hydroxyl containing polymer with formaldehyde and a monomeric organic monothiol for five hours at 15° to 65° C. in the presence of an acidic catalyst. Preferably from one to fours mols each of thiol and formaldehyde are used per hydroxyl group of the polymer.

The more detailed practice of the invention is illustrated by the following examples wherein parts given are by weight. There are, of course, many forms of the invention other than these specific embodiments.

Example I

To 27 parts of cellulose acetate (52.7% combined acetic acid; 0.8 OH/GU-hydroxyl per glucose unit) dissolved in 110 parts of acetic acid is added with stirring a solution prepared by warming a mixture of 18 parts of 2-mercaptothiazoline, 4.5 parts para-formaldehyde, 23 parts acetic acid and 0.3 part sulfuric acid. The resulting mixture becomes clear upon warming and after one hour at 60° C., the solution is diluted by the addition of 300 parts of 50% acetic acid and added slowly with stirring to 1,000 parts of water at 50° C. The resulting, finely divided, white solid is washed successively with methanol and water, and dried at 60° C. The product analyzes for 4.1% sulfur and 47.3% combined acetic acid. This corresponds to 0.20 2-triazolinylthiomethyl and 2.2 acetyl groups per glucose unit. The reaction is believed to occur as indicated below:

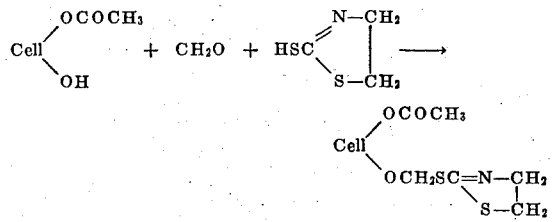

Clear, bright films of 2-thiazolinylthiomethylcellulose acetate cast from acetone solution have a tensile strength of 12,350 p. s. i., at 8% elongation as compared with corresponding values of 12,100 p. s. i. at 13% elongation for the original cellulose acetate. Introduction of 2-thiazolinylthiomethyl groups into cellulose acetate results in products having substantially lowered water absorption and improved dimensional stability. For example, a dry film of the 2-thiazolinylthiomethylcellulose acetate immersed in water for 24 hours gains in weight only 11.5% as compared with a gain in weight of 21.4% for the similarly treated, unmodified cellulose acetate film.

Replacement of 2-mercaptothiazoline in the above reaction with 14 parts of mercaptoacetic acid, or with 17.5 parts of cyclohexanethiol, results in the formation of the corresponding thiomethylcellulose acetates.

Example II

To a solution of five parts of dry 2-thiazolinylthiomethylcellulose acetate (prepared as described in Example I) in 110 parts of dioxane-methanol (70–40) is added with stirring six parts of 5% sodium methylate in methanol. Precipitation occurs rapidly and after one hour at 40° C., the product is removed by filtration, thoroughly washed with methanol and water until free of alkali, and dried. The finely divided, white, 2-thiazolinylthiomethylcellulose analyzes for 5.88% sulfur and only 1.2% combined acetic acid. This indicates the presence of 0.20 2-thiazolinylthiomethyl group per glucose unit. The probable reaction is given below:

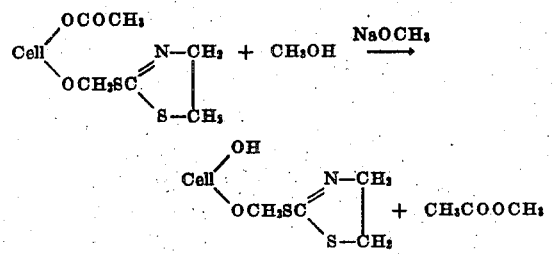

The above experiment shows that the 2-thiazolinylthiomethyl groups are chemically attached to the cellulose and are resistant to removal by alkaline hydrolysis.

*Example III*

To 35 parts of cellulose acetate (56% combined acetic acid; 0.5 OH/GU) dissolved in 150 parts of acetic acid containing 4.4 parts of water (2% on solution) and 0.66 part of sulfuric acid (0.3% on solution) is added with stirring a solution prepared by warming a mixture of 15.5 parts of 2-mercaptothiazoline and 3.9 parts of paraformaldehyde, 10 parts of dioxane and 0.03 part of 25% potassium hydroxide in methanol. The reaction mixture is kept at 60° C. for 20 minutes and then five parts of sodium acetate in 30 parts of 50% aqueous acetic acid is added with stirring. The mixture is diluted with 280 parts of 50% acetic acid and added slowly with stirring to 800 parts of methanol. The resulting white solid is washed thoroughly with methanol and water, and dried at 65° C. The purified product contains 0.38% N. This corresponds to the introduction of 0.08 2-thiazolinylthiomethyl group per glucose unit. The product dissolves readily in acetone, dioxane, chloroform-methanol and other common solvents for secondary cellulose acetate to give smooth solutions suitable for spinning or for casting films.

When the reaction is carried out as described above with the exception that 5% water based on the solution is present, the resulting product contains 0.30% N, or 0.06 2-thiazolinylthiomethyl group per glucose unit. These results demonstrate that the reaction can be carried out in the presence of a limited amount of water although the reaction efficiency is lowered somewhat.

*Example IV*

Three hundred (300) parts of a 12% solution of secondary cellulose acetate (56% combined acetic acid; 0.5 OH/GU) in acetic acid containing 5% water and 0.3% sulfuric acid is obtained by hydrolysis of primary cellulose acetate prepared in acetic acid solution. To this solution at 55° C. is added with stirring a solution prepared by warming a mixture of 18 parts of 2-mercaptothiazoline, 4.5 parts of para-formaldehyde, 10 parts of dioxane and 0.03 part of 25% potassium hydroxide in methanol. After thirty minutes at 55° C., the product is isolated, washed, stabilized and dried in the usual manner for obtaining secondary cellulose acetate. The resulting 2-thiazolinylthiomethylcellulose acetate gives smooth clear acetone solutions which are suitable for spinning.

*Example V*

A solution prepared by warming a mixture of 7.8 parts of 2-mercaptothiazoline, 1.95 parts of para-formaldehyde, 20 parts of dioxane and 0.06 part of 25% potassium hydroxide in ethanol is kept at 60° C. for ten minutes and then added with stirring to 35 parts of cellulose acetate (56% combined acetic acid; 0.5 OH/GU) in 138 parts of acetic acid at 70° C. Eight (8) parts of acetic acid containing 0.4 part p-toluenesulfonic acid is added and the solution heated at 70° C. for fifteen minutes. The product, isolated as described in Example III, contains 0.51% N, or 0.11 2-thiazolinylthiomethyl group per glucose unit. The 2-thiazolinylthiomethylcellulose acetate dissolves readily in acetone and films cast from this solution have a much lower water absorption than those prepared from the original cellulose acetate.

It is to be noted that the above result is not obtained when the reaction of cellulose acetate with 2-mercaptothiazoline and formaldehyde is carried out heterogeneously. For example, when cellulose acetate film containing 12% of a 2-mercaptothiazoline-formaldehyde condensate, prepared as described above, is heated at 125° C. for one hour in the presence of 0.5% p-toluenesulfonic acid as catalyst, a crosslinked, insoluble product results. The insolubility of such products limits their utility in many applications and makes difficult the recovery of unused reagents.

*Example VI*

To 27 parts of cellulose acetate (56% combined acetic acid; 0.5 OH/GU) in 110 parts of acetic acid is added with stirring a solution prepared by heating a mixture of 60 parts of 2-mercaptothiazoline, 15 parts of para-formaldehyde, 52 parts of acetic acid and 0.13 part of p-toluenesulfonic acid. After twenty hours at 30° C., the product is isolated as described in Example I. The product analyzes for 0.10% N, 0.44% S and 56.4% combined acetic acid. These results indicate the presence of 0.02 2-thiazolinylthiomethyl group per glucose unit.

*Example VII*

To 30 parts of cellulose acetate (52.7% combined acetic acid; 0.8 OH/GU) in 120 parts of acetic acid is added a solution prepared by warming a mixture of 55.7 parts of 2-mercaptobenzothiazole, 10 parts of para-formaldehyde, 86 parts of acetic acid and 0.3 part of p-toluenesulfonic acid. The reaction mixture is stirred for two hours at 100° C., diluted with 100 parts of benzene and added slowly with agitation to 800 parts of benzene. The white precipitate is washed thoroughly with benzene, methanol, and water, and then dried at 65° C. The product analyzes for 0.44% S, or for 0.04 thiomethyl group per glucose unit.

In carrying out the process of this invention, there can be employed any organic solvent-soluble, linear, high molecular weight polymer which contains unsubstituted hydroxyl groups. Suitable hydroxylated polymers include cellulose esters and ethers such as cellulose acetate, cellulose nitrate, ethylcellulose, and benzylcellulose, polyvinyl alcohol, partially hydrolyzed polyvinyl acetate, polyvinyl butyral and hydrolyzed vinyl acetate interpolymers. Cellulose derivatives having from 0.1 to 1.5 unsubstituted hydroxyl groups per glucose unit are preferred because they react readily at moderate temperatures in common organic solvents to give uniformly modified products which show substantial improvement in many properties such as reduced water absorption and increased dimensional stability. Cellulose acetate is particularly preferred since it reacts with exceptional ease, and in this manner products showing greatly improved water resistance can be obtained. Furthermore, the reaction can be conveniently carried out in conjunction with the preparation of secondary cellulose acetate.

Any organic monomeric monothiol in which the thiol group is the sole group reactive toward formaldehyde can be used in this invention. Aliphatic thiols in which any open chain present has six or less carbon atoms are preferred because they react more readily and yield products having desirable solubility characteristics. Thiols having the thiol group attached to a carbon of a heterocyclic ring, in particular a thiazacyclic ring, such as 2-mercaptothiazoline and its alkyl or aryl substitution products, are outstanding in their reactivity and yield particularly useful products. Furthermore, when the reaction is carried out simultaneously with the preparation of secondary cellulose acetate, 2-mercaptothiazoline reacts much more efficiently than other thiols. Examples of suitable thiols include mercaptoacetic acid, ethyl mercaptoacetate, N-dimethyl (mercaptoacetamide), ethoxyethanethiol, benzyl mercaptan, cyclohexanethiol, 2-mercapto-6-nitrobenzothiazole, chlorobutanethiol, dimethylaminoethanethiol, 2-mercaptobenzothiazole, ethanethiol, 2-mercaptothiazoline, 2 - mercapto-4-methylthiazole, and 2-mercapto-5-carbomethoxythiazole.

Although any aldehyde can be used in this invention, formaldehyde, or a substance liberating formaldehyde, is preferred since it is outstanding in its reactivity. Even closely related compounds such as acetaldehyde lead to a much lower degree of substitution. Although either formaldehyde or the thiol can be used in excess, in general at least one mol of thiol is used per mol of formaldehyde and best results are obtained when the agents are present in substantially equal molecular quantities since this leads to more efficient utilization of the reactants and to products showing good solubility characteristics. Depending upon the degree of modification desired, from 0.1 to 10 mols or more of thiol can be used per hydroxyl group of the polymer. In general, the use of 1 to 4 mols of thiol per hydroxyl group is preferred since this favors a short reaction time and gives products which are substantially modified. An S-methylol compound can be used in place of the thiol and formaldehyde.

The choice of solvent for use in this invention will depend largely on the polymer used. For example, acetic acid is suitable for use with cellulose acetate containing 52% to 60% combined acetic acid, benzene with ethylcellulose having an ethoxyl content of 48.5% to 50%, and formic acid with polyvinyl alcohol.

Reaction occurs readily at temperatures ranging from 15° to 100° C. or higher in the presence of an acidic catalyst. Temperatures in the range of 30° to 65° C. are preferred, particularly with cellulose derivatives, in order to obtain undegraded products showing good solubility characteristics. Strong acids such as sulfuric, hydrochloric, p-toluenesulfonic, and naphthalenesulfonic acids are effective catalysts for the reaction. Salts such as ammonium chloride, ammonium sulfate and sodium hydrogen sulfate, which liberate strong acids under reaction conditions, can also be used as catalysts.

The products of this invention may be defined as organic solvent-soluble, linear, high molecular weight, i. e. macromolecular, polymers having as side chains sulfur-substituted mercaptomethoxy groups. They are solids soluble in at least one organic solvent, the particular solvent depending principally on the particular hydroxylated polymer from which the derivative is prepared. These products are uniformly, rather than superficially, modified. They are characterized by the presence of the side chain —O—CH$_2$—S—R, wherein R is the non-mercapto portion of an organic thiol, said side chain being attached through its oxygen to a carbon atom of the polymer residue. The water resistance and dimensional stability of the products vary, of course, with the degree of substitution and molecular weight of the substituent groups. The process of this invention offers a means of improving the water resistance and dimensional stability of hydroxylated polymers, e. g., cellulose acetate as illustrated in Example I.

It is possible by the process of this invention to obtain uniformly modified derivatives which are soluble in organic solvents, whereas insoluble, and hence less useful, products are obtained by heterogeneous reaction, as indicated in the last paragraph of Example V. Another advantage of the process is that the modified polymers have improved dyeing characteristics in comparison with the corresponding unmodified hydroxylated polymer.

The products of this invention are useful in the preparation of films, fibers, plastics and coating compositions.

The above description and examples are intended to be illustrative only. Any modification thereof or variation therefrom which conforms to the spirit of the invention is intended to be included within the scope of the claims.

What is claimed is:

1. An organic solvent-soluble 2-thiazolinylthiomethylcellulose acetate.

2. An organic solvent-soluble cellulose acetate having cellulosic hydroxyl hydrogen replaced by a radical

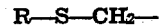
R—S—CH$_2$— wherein R is the non-mercapto portion of an organic thiol.

3. An organic solvent-soluble cellulose acetate according to claim 2 wherein R is a thiazolinyl radical.

4. An organic solvent-soluble cellulose acetate according to claim 2 wherein R is a monovalent heterocyclic radical containing heterocyclic nitrogen and sulfur.

5. An organic solvent-soluble cellulose ester having cellulosic hydroxyl hydrogen replaced by a radical

R—S—CH$_2$— wherein R is the non-mercapto portion of an organic thiol.

6. An organic solvent-soluble cellulose ether having cellulosic hydroxyl hydrogen replaced by a radical

R—S—CH$_2$— wherein R is the non-mercapto portion of an organic thiol.

7. An organic solvent-soluble ethylcellulose having cellulosic hydroxyl hydrogen replaced by a radical

R—S—CH$_2$— wherein R is the non-mercapto portion of an organic thiol.

8. An organic solvent-soluble derivative of a macromolecular, linear polymer having free hydroxyl groups in which derivative hydroxyl hydrogen is at least in part replaced by radicals of the formula

R—S—CH₂— wherein R is the non-mercaptan portion of an organic thiol.

9. An organic solvent-soluble, macromolecular, linear polymer having attached to the chain of the polymer substituents of the formula

R—S—CH₂—O— wherein R is the non-mercaptan portion of an organic thiol.

10. Process which comprises reacting, in solution in an inert liquid organic solvent and in the presence of an acidic catalyst, formaldehyde and a monomeric organic thiol, with an organic solvent-soluble, macromolecular, linear polymer containing free hydroxyl groups.

11. Process which comprises reacting, in solution in an inert liquid organic solvent and in the presence of an acidic catalyst, formaldehyde and a monomeric organic thiol, with an organic solvent-soluble cellulose ester having free hydroxyl groups.

12. Process which comprises reacting, in solution in an inert liquid organic solvent and in the presence of an acidic catalyst, formaldehyde and a monomeric organic thiol, with an organic solvent-soluble cellulose acetate having from 0.1 to 1.5 hydroxyl groups per glucose unit.

13. Process which comprises reacting, in solution in an inert liquid organic solvent and in the presence of an acidic catalyst, formaldehyde and 2-mercaptothiazoline with an organic solvent-soluble cellulose ester having free hydroxyl groups.

14. Process which comprises reacting, in solution in an inert liquid organic solvent and in the presence of an acidic catalyst, formaldehyde and a monomeric organic thiol, with an organic solvent-soluble cellulose ether having free hydroxyl groups.

15. Process which comprises reacting, in solution in an inert liquid organic solvent and in the presence of an acidic catalyst, formaldehyde and a monomeric organic thiol, with an organic solvent-soluble ethylcellulose having free hydroxyl groups.

16. An organic solvent-soluble, macromolecular, linear polymer having attached to the chain of the polymer substituents of the formula

R—S—CH₂—O— wherein R is a heterocyclic radical containing nitrogen and sulfur.

17. An organic solvent-soluble, macromolecular linear polymer having attached to the chain of the polymer substituents of the formula

R—S—CH₂—O— wherein R is the 2-thiazolinyl radical.

WILLIAM JAMES BURKE.